R. LA FRANCE.
APPARATUS FOR TRANSFERRING GLASS TO MOLDS.
APPLICATION FILED JUNE 17, 1918.
1,331,511.
Patented Feb. 24, 1920.
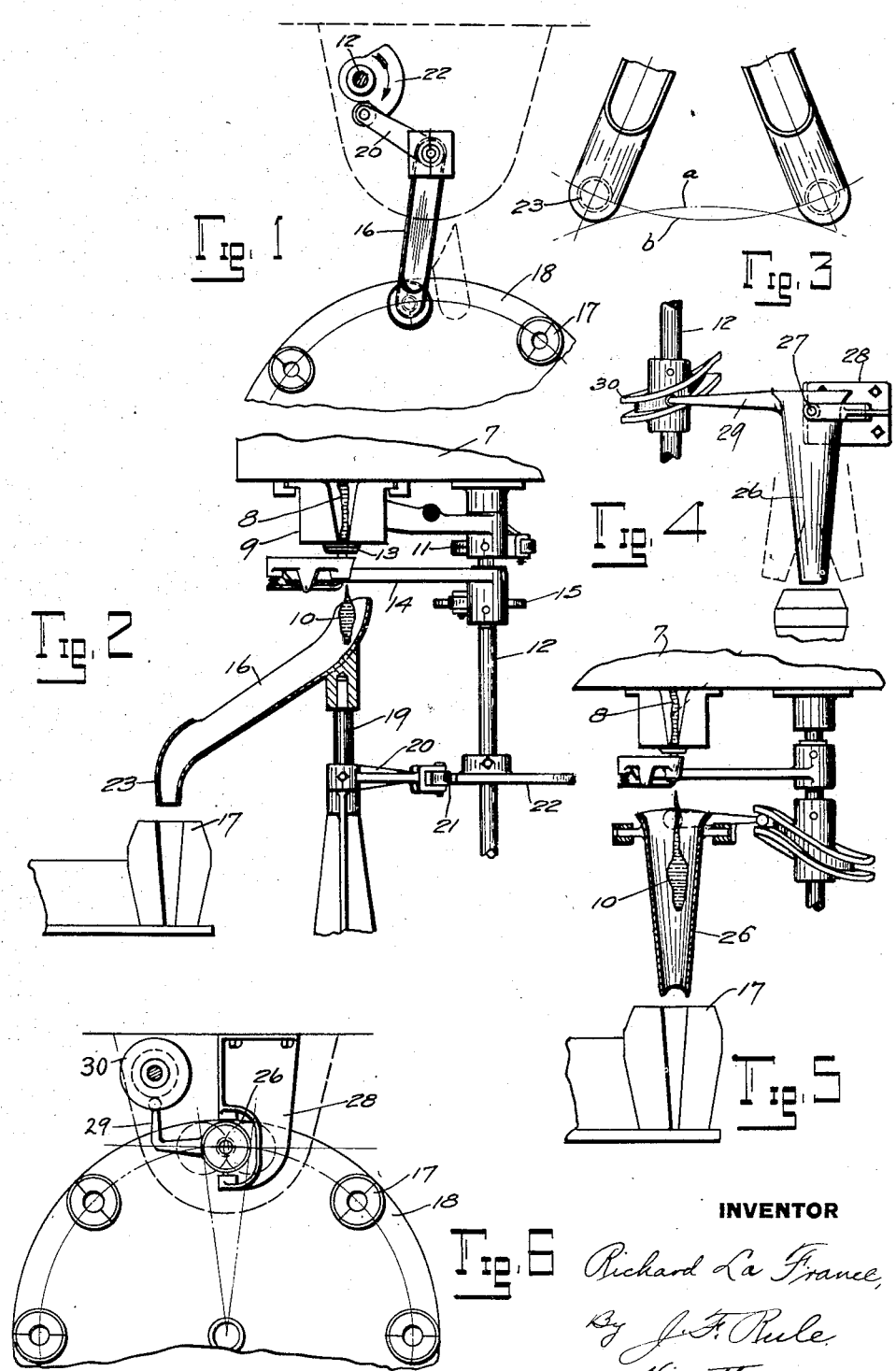
INVENTOR
Richard La France,
By J. F. Rule
His attorney.

UNITED STATES PATENT OFFICE.

RICHARD LA FRANCE, OF TOLEDO, OHIO, ASSIGNOR TO THE OWENS BOTTLE MACHINE COMPANY, OF TOLEDO, OHIO, A CORPORATION OF OHIO.

APPARATUS FOR TRANSFERRING GLASS TO MOLDS.

1,331,511. Specification of Letters Patent. Patented Feb. 24, 1920.

Application filed June 17, 1918. Serial No. 240,274.

*To all whom it may concern:*

Be it known that I, RICHARD LA FRANCE, a citizen of the United States, residing at Toledo, in the county of Lucas and State of Ohio, have invented new and useful Improvements in Apparatus for Transferring Glass to Molds, of which the following is a specification.

My invention relates to apparatus for transferring or guiding charges of molten glass to molds or other receptacles, and is particularly designed for directing charges or gobs of glass to the molds on a continuously rotating machine.

An object of the invention is to provide a simple and practical device for rapidly transferring the glass and accurately guiding it into the moving molds without material loss of heat or change in the form of the glass when the latter has been formed into gobs prior to such transfer.

Other objects of the invention and the precise nature thereof will appear more fully hereinafter.

In the accompanying drawings:

Figure 1 is a plan view showing a transfer device constructed in accordance with the principles of my invention.

Fig. 2 is a part sectional elevation of the same.

Fig. 3 is a detail indicating diagrammatically the path of movement of the delivery end of the trough relative to the path of the molds.

Fig. 4 is an elevation of a modified construction.

Fig. 5 is a sectional elevation of the same viewed in a direction at right angles to that of Fig. 4.

Fig. 6 is a plan view of the same.

The molten glass may be supplied as usual from a continuous melting tank provided with a boot or extension 7 having an opening in the bottom thereof through which the glass 8 flows in a continuous stream. The glass accumulates in a sectional cup or receptacle 9 to form individual charges or gobs 10. The cup 9 is made in sections movable laterally to and from each other, the movement being controlled by a cam 11 on a cam shaft 12. A knife 13 mounted on a swinging arm 14 forms a temporary bottom for the cup. The knife is operated by a cam 15 on the shaft 12. When a portion of a charge has accumulated in the cup the knife is withdrawn. After enough glass has accumulated to complete a gob the cup sections are separated, permitting the gob to drop. The cup sections then come together and the knife moves across the bottom of the cup to sever the gob from the oncoming stream and closes the bottom of the cup, permitting the succeeding charge to accumulate. The above described gob forming apparatus is at present in commercial use and is not *per se* a part of the present invention.

An oscillating transfer device 16, which is shown in the form of a trough or chute, is provided to direct the gobs 10 into molds 17, the latter mounted on the continuously rotating table 18 forming part of a glass forming machine. The chute 16 is mounted on a vertical rock shaft 19 to which is secured a rock arm 20 carrying a cam roll 21 held by a spring (not shown) against a cam 22, the latter preferably mounted on the cam shaft 12. The upper end of the trough 16 is directly beneath and in register with the cup 9, and the surface of the trough against which the glass strikes as it drops from the cup is approximately vertical, so that the glass strikes it with a glancing blow, which does not retard the gob or materially alter its form. The trough is sufficiently steep so that the glass slides rapidly downward, the movement of the gob being accelerated rather than retarded throughout its entire travel from the cup to the mold. The lower end 23 of the trough may be in the form of a funnel having a somewhat smaller opening than that of the upper end of the mold 17 to suitably shape and accurately guide the gob into the mold.

The cam shaft 12 makes one complete rotation for each gob. The cam 22 is so formed that it oscillates the trough 16, causing the latter to move in the same direction as the mold 17 and in register therewith while the mold is passing the charging station. It will, of course, be understood that the cam 22 is so adjusted and timed with respect to the movement of the mold that the above described registration is maintained. As the upper end of the trough is directly over the rock shaft 19 it is always in register with the gob forming cup. It will be understood that any approved gob forming apparatus may be substituted for that shown, also that the glass may be permitted to flow in a stream directly onto and down the trough 16. Such stream flow may constitute a greater or less portion of the entire charge of glass.

It will be observed that the lower end of the trough 16 swings in a horizontal arc whose center is outside of the arc or circle in which the molds revolve. In Fig. 3 the path of movement of the molds is indicated by an arc *a*, while the path of movement of the discharge opening 23 of the trough is indicated by an arc *b*. By making these arcs overlap slightly so that the path of the trough is outside of the arc *a* at the beginning and end of the movement of the trough with the mold, the trough registers with the mold with sufficient accuracy to guide the glass into the mold at any time during the entire forward movement of the trough. In other words, the trough is in substantial register with the mold during a longer arc of movement than if the circles *a* and *b* were tangent.

In the modification (Figs. 4, 5 and 6) the transfer device is in the form of a funnel or guard 26 pivoted on a bracket 28 to swing about a horizontal axis 27. An arm 29 extending horizontally from the guard 26 engages a cam 30 on the cam shaft 12. This cam is formed to move the arm 29 up and down, thereby swinging the lower end of the guard back and forth in an approximately horizontal direction. The limit of movement of the guard in each direction is indicated in broken lines in Fig. 4, and in broken line circles in Fig. 6.

If the operation of the divided cup is accurately timed to correspond with the movement of the molds beneath the flow opening the gob 10 may drop through the guard 20 without contacting the sides of the guard to any extent. If, however, the charge is dropped before or after the mold reaches a position directly beneath the cup, it will be accurately guided into the mold by said guard. When the operation of the knife does not take place early enough to prevent more or less of a stream flow, the tail or stream of glass following the gob is guided into the mold.

Variations may be resorted to without departing from the spirit and scope of my invention.

What I claim is:

1. The combination with means for supplying charges of molten glass, of a series of continuously moving molds or receptacles, an oscillating chute by which the glass is guided into the receptacles, said chute having its upper end continuously in register with said supplying means and its lower end arranged to move with the molds and remain in register with each mold as the latter is passing the charging station, said chute having a guiding surface shaped to direct the charges into the molds without any abrupt change in their direction of movement from said supply means to the molds.

2. The combination with gob forming apparatus for forming and discharging gobs of molten glass, of a series of continuously moving molds, a transfer device comprising a chute down which the gobs are directed to the molds, said chute having its upper receiving end substantially vertical and in register with said forming apparatus, and a cam operable to oscillate said chute and cause the discharge end thereof to advance with each mold and then return and advance with the next succeeding mold, said chute having a guiding surface shaped to direct the charges into the molds without any abrupt change in their direction of movement from said supply means to the molds.

3. The combination with means for establishing a flow of molten glass, of an open bottomed cup in which the glass accumulates to form gobs or charges, a knife forming a closure for the bottom of the cup, a cam shaft, cams thereon for withdrawing the knife and opening the cup to drop said gobs, continuously moving molds, a chute having its upper end beneath and in register with said cup to receive said gobs, a cam on said shaft to oscillate the chute, said cam formed and timed to maintain the lower end of the chute in register with a mold while the latter is passing the charging station and then return and register with the succeeding mold.

4. The combination with means for establishing a flow of molten glass, of an open bottomed cup in which the glass accumulates to form gobs or charges, a knife forming a closure for the bottom of the cup, a cam shaft, cams thereon for withdrawing the knife and opening the cup to drop said gobs, continuously moving molds, a chute having its upper end beneath and in register with said cup to receive said gobs, a cam on said shaft to oscillate the chute, said cam formed and timed to maintain the lower end of the chute in register with a mold while the latter is passing the charging station and then return and register with the succeeding mold, the receiving and discharging ends of the chute having substantially vertical guiding surfaces merging into an intermediate guiding surface and providing therewith a surface by which the gobs are guided through the chute without any abrupt change in direction.

5. In combination, an oscillating chute for molten glass, and means to drop glass vertically to the chute, said chute having substantially vertical receiving and discharging ends and an intermediate body portion merging into said ends, thereby providing a guiding surface by which the glass is guided through the chute without any abrupt change in direction.

6. The combination of an oscillating chute for molten glass, and means to drop glass vertically to the chute, said chute having substantially vertical receiving and discharging ends and an intermediate body portion merging into said ends to provide a guiding surface by which the glass is guided through the chute without any abrupt change in direction, the receiving end being at the axis of oscillation.

7. Means for supplying molten glass, an oscillating chute having a substantially vertical receiving end continuously in register with the supply means, means to drop charges of glass vertically to the chute, and a moving receptacle, the discharge end of the chute moving in register with said receptacle, the chute formed to provide a guiding surface by which the glass is guided without any abrupt change in direction during its passage through the chute.

Signed at Toledo, in the county of Lucas, and State of Ohio, this 13th day of June, 1918.

RICHARD LA FRANCE.